United States Patent [19]

Yoshimura et al.

[11] Patent Number: 4,756,737

[45] Date of Patent: Jul. 12, 1988

[54] APPARATUS FOR PRODUCING OPTICAL ELEMENT

[75] Inventors: Fumitaka Yoshimura; Masaaki Yokota, both of Yokohama; Kiyoshi Yamamoto, Yono; Toru Aruga, Yokohama; Isamu Shigyo, Chiba, all of Japan

[73] Assignee: Canon Kabushiki Kaisha, Tokyo, Japan

[21] Appl. No.: 936,244

[22] Filed: Dec. 1, 1986

[30] Foreign Application Priority Data

Nov. 29, 1985 [JP] Japan .................................. 60-269176

[51] Int. Cl.⁴ ............................................. C03B 23/00
[52] U.S. Cl. ....................................... 65/275; 65/60.1; 65/268; 65/102; 65/286; 65/321
[58] Field of Search ................ 65/64, 77, 68, 78, 60.1, 65/268, 102, 275, 286, 321

[56] References Cited

U.S. PATENT DOCUMENTS 3,185,556 5/1965 Cala .......................................... 65/39
3,573,888 4/1971 Bogart ................................ 65/60.1 X
4,398,935 8/1983 Hendricus et al. ...................... 65/64
4,435,200 3/1984 Joorman et al. .................. 65/102 X

FOREIGN PATENT DOCUMENTS 3443607 6/1985 Fed. Rep. of Germany .......... 65/64
60-118641 6/1985 Japan .
60-118639 6/1985 Japan .
1021927 1/1986 Japan .................................... 65/102
60-6139 1/1986 Japan .

Primary Examiner—Arthur Kellogg
Attorney, Agent, or Firm—Fitzpatrick, Cella, Harper & Scinto

[57] ABSTRACT

There is disclosed an apparatus for producing optical elements, provided with a conveyor for transporting carriers for materials of optical elements into an evacuatable process chamber, and with a heating system for the material supported by the carrier, a forming system for the material supported by the carrier while the material is heated by the heating system, and a system for depositing a thin film to the material formed by the forming system and supported by the carrier.

5 Claims, 4 Drawing Sheets

APPARATUS FOR PRODUCING OPTICAL ELEMENT

BACKGROUND OF THE INVENTION

1. Field of the Invention

The present invention relates to an apparatus for producing optical elements such as lenses, prisms, mirrors, filters or the like, and more particularly to such apparatus suitable for continuous production of optical elements having vacuum evaporated layers on the functional faces of such elements.

2. Related Background Art

Optical elements, such as lens, prism, mirror or filter, are generally produced by grinding a material such as glass to a desired shape, then polishing functional faces thereof which transmit and/or reflect light to an optically smooth state, sufficiently washing said faces and depositing an anti-reflection layer or a reflection enhancing layer onto such functional faces for example by vacuum evaporation method.

However, such production has required considerable labor of experienced workers in order to obtain a desired surface precision, i.e., desired surface form and coarseness, by means of grinding and polishing. Also for depositing the thin layer onto the functional faces after polishing, a considerable time has to be spent in meticulous washing for removing the polishing material deposited in the polishing step. Furthermore, in thin layer deposition, for example by vacuum evaporation, which is usually conducted in a batch process wherein a plurality of materials for optical elements are simultaneously processed in a vacuum apparatus, it is desirable to place all the materials at the same distance from the source of evaporation. For this reason, there is required an operation of placing the materials for the optical elements on an umbrellashaped support member provided with plural apertured support seats, and said operation cannot be easily automated and cannot be considered efficient in mass production.

As explained in the foregoing, the conventional process for producing optical elements consists of independent process steps which are conducted in separate apparatus, so that there are required ancillary works such as the transportation of the material by the workers between different process steps and the setting of the materials on the process apparatus. Also, the formation of the functional faces by grinding and polishing increases the number of process steps and necessitates a meticulous washing step prior to the deposition of thin layer, and a significant storage space is indispensable for the products in process, due to the difference in the speeds of the process steps. For these reasons the production efficiency is not satisfactorily high.

SUMMARY OF THE INVENTION

In consideration of the foregoing, an object of the present invention is to provide an apparatus capable of producing optical elements of a desired shape and of a desired surface precision of the functional faces and provided with thin layer coating on the function faces, in continuous manner.

Another object of the present invention is to provide, for use in an apparatus for producing optical elements by heat pressing of a glass material, a carrier suitable for repeating the steps of charging, processing and transporting of the glass material, and, in particular, a carrier which can be used particularly in both of the heating and pressing steps without the necessity of transfer to another carrier when the glass material is transported from the heating step to the pressing step, thereby allowing the process steps and the works associated therewith to be expedited.

Still another object of the present invention is to provide a producing apparatus wherein the same carrier can be employed in the vacuum evaporation of the optical elements when they are transported, after heating and pressing, on a carrier to the evaporation step.

DETAILED DESCRIPTION OF THE PREFERRED EMBODIMENTS

Now the present invention will be clarified in detail by an embodiment thereof shown in the attached drawings.

Figure 1:
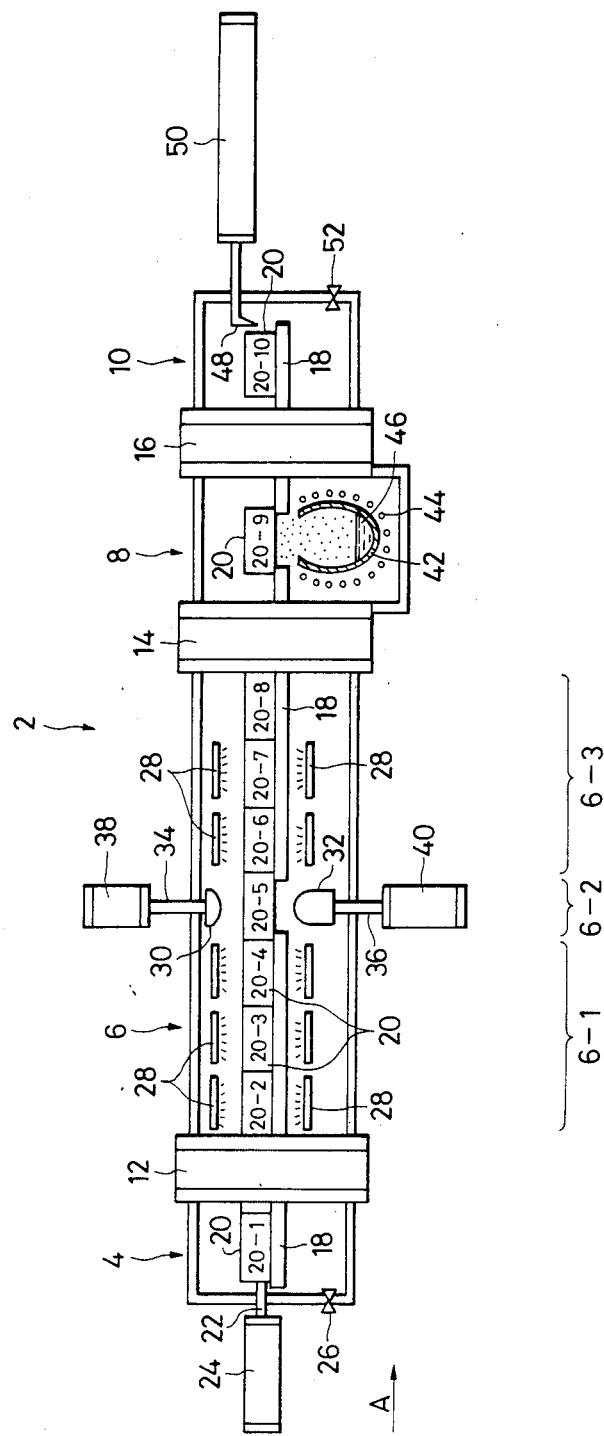
FIG. 1 is a schematic view of an apparatus for producing optical elements embodying the present invention.

FIG. 1 schematically shows an apparatus for producing optical elements embodying the present invention.

A processing chamber 2 is composed of an entrance chamber 4, a forming chamber 6, an evaporation chamber 8 and an exit chamber 10. Between the neighboring chamber there are provided gate valves 12, 14 and 16 for forming an air-tight seal between the chamber. In said process chamber 2, and extended over the entrance chamber 4, forming chamber 6, evaporation chamber 8 and exit chamber 10, there are provided guide rails 18 for transporting carriers for supporting the optical elements. On said guide rails there are placed carriers 20 for supporting the optical elements and these are rendered movable in a direction A.

The entrance chamber 4 is provided with an unrepresented door with an air-tight seal, in order to enable placement of the carriers 20 onto the guide rails 18 from the outside. Also the entrance chamber 4 is provided with a pusher 22, activated by a cylinder 24, for pushing the carrier 20, placed on the guide rails 18 in said chamber, in the direction A toward the forming chamber 6 when the gate valve 12 is opened. Said pusher 22 can be moved when the entrance chamber 4 is sealed from the outside. The entrance chamber 4 is further provided with a leak valve 26 for communication with the outside, and an unrepresented vacuum pump for evacuating the interior of said chamber 4.

The forming chamber 6 is divided into a heating zone 6-1, a press zone 6-2, and a slow cooling zone 6-3. In the heating zone 6-1 there are provided heater 28, such as halogen lamps or infrared heaters above and below the guide rails 18. In the press zone 6-2 there are provided, respectively above and below the guide rails 18, an upper press mold 30 and a lower press mold 32, fixed to vertically movable rods 34, 36 which are activated by cylinders, 38, 40. Said rods 34, 36 can be moved while the forming chamber 6 is sealed from the outside. In the slow cooling zone 6-3 there are provided heaters 28 above and below the guide rails 18. The forming chamber is further provided with an unrepresented vacuum pump for evacuating the interior of said chamber 6.

In the evaporation chamber 8, there is provided, below the guide rails 18, a container 42 for example of molybdenum for containing a material to be evaporated, and said container is provided with a heater 44 for example a high-frequency heater. Said container 42 has an upper aperture, so that an internally contained material 46 scatters upwards when evaporated by heating. The evaporation chamber 8 is provided with an unrepresented vacuum pump for evacuation.

The exit chamber 10 is provided with a traction rod 48, activated by a cylinder 50, for transferring the carrier 20 on the guide rail from the forming chamber 6 to the evaporation chamber 8, and further to the exit chamber 10 along the direction A, when the gate valves 14, 16 are opened. Said traction rod can be moved when the exit chamber is sealed from the outside. The exit chamber 10 is further provided with an unrepresented door with an airtight seal, so that the carrier 20 moved to the exit chamber along the guide rails can be taken out. The exit chamber 10 is further provided with a leak valve 52 for communication with the outside, and an unrepresented vacuum pump for evacuating the interior of said chamber.

Figure 2:
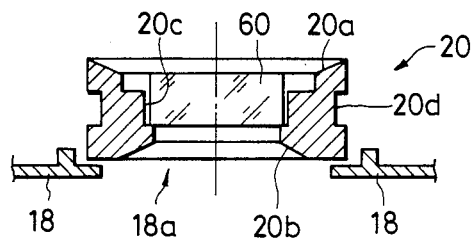
FIG. 2 is a cross-sectional view of a carrier.

FIG. 2 is a cross-sectional view of said carrier 20, showing a state supporting a material for optical element and being supported by the guide rails 18, when seen in the direction A.

As shown in FIG. 2, the carrier 20 has an annular form, of which upper and lower faces 20a, 20b are formed so as to match the upper and lower molds 30, 32 in said press zone. Also the internal periphery 20c of the carrier 20 is so formed as to correspond to the desired external periphery of the optical element. Said carrier 20 is composed of a material the linear thermal expansion coefficient of which is smaller than that of the material for the optical element, for example molybdenum in case said material is an ordinary optical glass. As will be apparent from the foregoing explanation, the carrier 20 also functions as a body mold in the formation of the optical element.

The carrier 20 contains a material 60 for optical element therein and is supported, at lower opposite ends thereof, by the guide rails 18 having an aperture 18a elongated in the direction A.

In the following there will be explained the function of the foregoing embodiment.

At first the gate valves 12, 14, 16 and the leak valves 26, 52 are closed and the forming chamber 6, evaporation chamber 8 and exit chamber 10 are evacuated by the vacuum pumps to a desired level of vacuum, for example $10^{-2}$ to $10^{-5}$ Torr. Then the heaters 28 of the forming chamber 6 are activated to a desired temperature, and the heaters 44 of the evaporation chamber 8 are activated to heat the container 42, thereby evaporating the material 46 contained therein. The above-mentioned evacuation of the forming chamber 6 is to prevent oxidation of the upper and lower molds 30, 32 at the forming temperature, to avoid eventual air retention between the material 60 for optical element and said molds 30, 32, and to facilitate continuous operation by reducing the difference, in the atmospheric condition, from the evaporation chamber 8.

Then a material 60 for optical element, made free of surface defects in advance, is placed in the carrier 20, which is then placed on the guide rail 18 in the entrance chamber 4, at a position 20-1 shown in FIG. 1, by opening the door with air-tight seal of said entrance chamber 4. In this manner there is attained a state shown in FIG. 2. Subsequently said door is closed, and the entrance chamber 4 is evacuated by the vacuum pump to a desired level of vacuum, for example $10^{-2}$ to $10^{-5}$ Torr.

Then the gate valve 12 is opened, and the pusher 22 is activated by the cylinder 24 to push the carrier 20, present on the guide rail 18 of the entrance chamber 4, to the heating zone 6-1 in the forming chamber 6 (position 20-2 in FIG. 1).

Subsequently the pusher 22 is returned to the original position, and the gate valve 12 is closed.

The leak valve 26 of the entrance chamber 4 is then opened to bring the interior thereof to the atmospheric pressure, and another carrier 20, supporting a new material for optical element is placed on the guide rail 18 of the entrance chamber 4 by opening the door with airtight seal thereof. The above-explained procedure is thereafter repeated.

On the other hand, the carrier 20 introduced into the forming chamber 6 from the entrance chamber 4 is pushed by succeeding carriers similarly introduced into the forming chamber, and proceeds in the direction A in succession in positions 20-3 to 20-8 in response to the every entry of another carrier 20.

In the course of the above-explained movement, the material is uniformly heated, in the heating zone 6-1, from above and from below by the heaters 28, the intensity of which is so adjusted that the material 60 reaches a temperature suitable for pressing when the carrier 20 arrives at the pressing zone 6-2 after movement with a desired speed.

Figure 3:
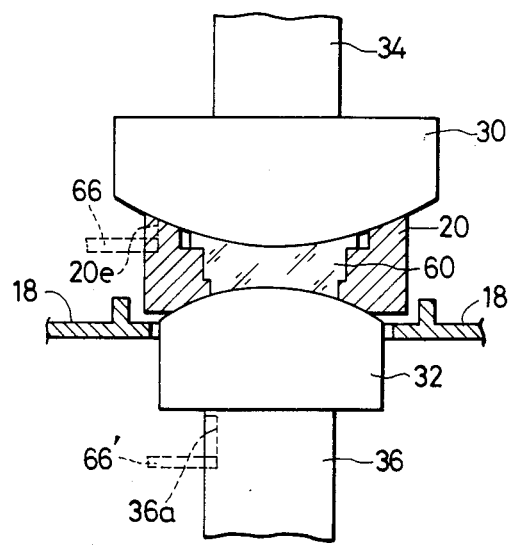
FIGS. 3 to 6 are cross-sectional views showing various states of pressing.

The material 60 for optical element, supported in the carrier 20 which has reached the press zone 6-2 is pressed by the upper and lower molds 30, 32 driven by the cylinders 38, 40. FIG. 3 is a cross-sectional view showing the state in said pressing, wherein the upper mold 30 is moved downwards while the lower mold 32 is moved upwards. The driving force for the lower mold is selected to be larger than that for the upper mold, and the stroke of said lower mold is limited by a stopper 66 (66') in such a manner that the carrier 20 is slightly lifted from the guide rail 18 at the uppermost limit position of the lower mold, as shown in FIG. 3. Said stopper 66 is fixed to the guide rail 18 and engages with a groove 20c provided in the carrier 20, while said stopper 66' is to provided as to engage with a groove 36a of the rod 36. Thus the upper and lower molds 30, 32 are brought into contact respectively with the upper and lower faces 20a, 20b of the carrier 20, and the material 60 supported therein is pressed by the carrier 20, upper mold 30 and lower mold 32. Said pressing can be satisfactorily achieved even if the rods 34, 36 of the upper and lower molds 30, 32 are in completely centered relative to each other. Since the carrier 20 is lifted from the guide rail 18 and supported only by the upper and lower molds as shown in FIG. 3, the carrier 20 can incline and achieve automatic centering even if the centers of the rods of the upper and lower molds do not coincide each other as shown in FIG. 4, so that no eccentricity results in the pressed material 60.

Subsequently ultrasonic vibration is provided by unrepresented means to facilitate separation of the pressed material 60 from the upper and lower molds 30, 32, and said upper and lower molds 30, 32 are respectively moved upwards and downwards by the cylinders 38, 40, whereby the carrier 20 is again placed on the guide rail 18, while supporting the pressed material 60 therein.

Figure 4:
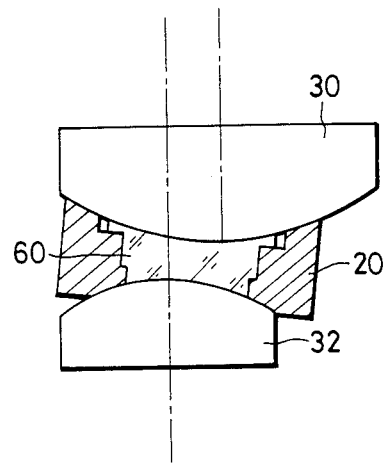
Figure 5:
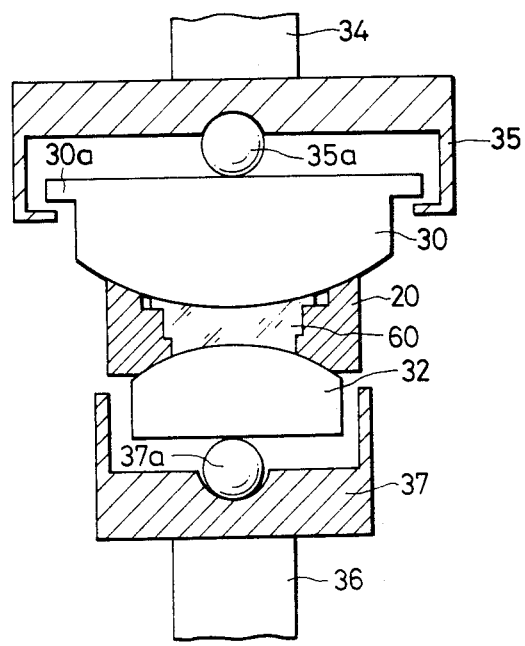
Figure 6:
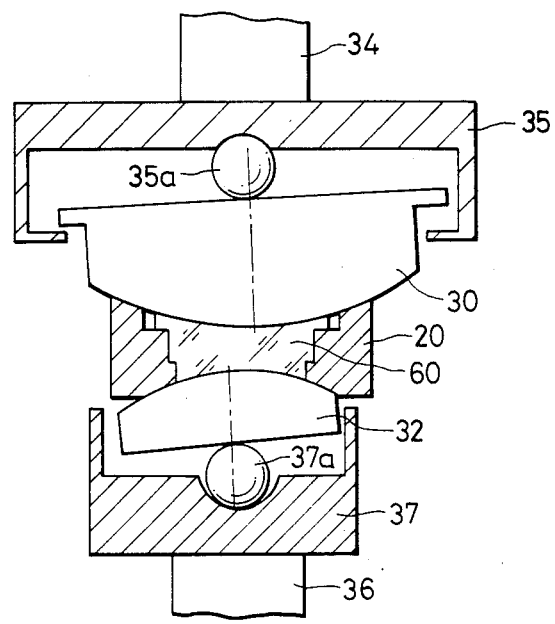

In the embodiment shown in FIGS. 3 and 4, the upper and lower molds 30, 32 are respectively fixed to the rods 34, 36, but they may also be constructed as shown in FIGS. 5 and 6. At the ends of the rods 34, 36 there are fixed mold holders 35, 37 which respectively hold the molds 30, 32 through balls 35a, 37a. The upper mold 30 is provided with an external flange 30a engaging with the holder 35, in order to prevent dropping of the mold. On the other hand, the lower mold 32 is simply placed on the holder 37. As illustrated, the upper and lower molds can vertically and laterally move to a certain extent with respect to the respective holders. Such upper and lower molds can be driven with the same driving force, so that the pressing is achieved in a state where the carrier 20 stays on the guide rail 18. Also in this case, the pressing can be satisfactorily achieved even if the centers of the rods 34, 36 of the upper and lower molds 30, 32 do not coincide completely with each other. More specifically, as shown in FIG. 6, the upper and lower molds 30, 32, receiving the driving forces of the holders 35, 37 through the balls 35a, 37a can easily incline when they are brought into contact with the upper and lower faces of the carrier 20 if the centers of the pressing rods are mutually eberrated. Consequently an automatic centering is achieved, and no eccentricity remains in the pressed material 60.

In the slow cooling zone 6-3, the carrier is uniformly heated by the heaters 28 from above and from below. The intensity of said heaters in the slow cooling zone is so adjusted that the material in the carrier 20 is cooled with an appropriate temperature slope to remove strain therein when the carrier 20 is moved with a desired speed.

After the carrier reaches the final position 20-8 of the slow cooling zone 6-3, the gate valves 14, 16 are opened and the traction rod 48 is activated by the cylinder 50 to extract the carrier 20 from said final position of the flow cooling zone to a predetermined position, above the container 42, in the evaporation chamber 8, each time a new carrier is introduced from the entrance chamber 4 into the forming chamber 6 by the pusher 22. Then the gate valves 14, 16 are closed, and the evaporation chamber 8 is evacuated by the vacuum pump to a level of vacuum required for vacuum evaporation process, for example $10^{-5}$ Torr or lower. Thus the material 46 evaporated from the container 42 is deposited on the lower face of the material 60 for optical element.

Figure 7:
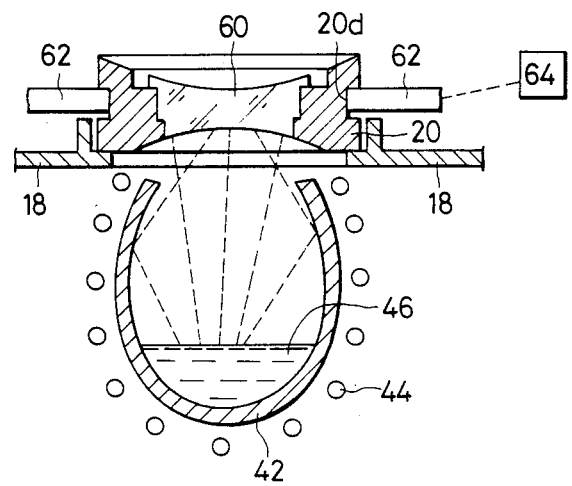
FIG. 7 is a cross-sectional view showing a state of vacuum evaporation.

After the thin layer is deposited on a face of the material 60 in this manner, an inverter arm 62 is extended from a lateral wall of the evaporation chamber 8 as shown in FIG. 7, engages with an engaging portion 20d of the carrier 20, lifts said carrier 20 by supporting the lateral wall thereof, inverts said carrier 20 by driving means 64 such as a motor and places said carrier 20 again on the guide rail 18. Subsequently a thin layer is deposited on the lower face in the same manner as explained above. In order that the material 60 does not drop from the carrier in the inverted state thereof, the internal periphery of said carrier is preferably given a suitable coarseness or a slight inverse tapering.

Then the carrier 20 is again inverted by the above-mentioned arm and inverting means.

After thin layers are deposited on both functional faces of the material supported by the carrier 20 in the evaporation chamber 8, said carrier 20 is transferred from the evaporation chamber 8 to the exit chamber 8 by means of the traction rod 48, simultaneously with the introduction of a new carrier 20 from the forming chamber 6 into the evaporation chamber 8 by said traction rod 48. When the gate valve 16 is closed for conducting vacuum evaporation in the evaporation chamber 8, the leak valve 52 of the exit chamber 10 is opened to bring the interior thereof to the atmospheric pressure, and the carrier 20 is taken out by opening the door with air-tight seal.

Then said leak valve 52 and the door are closed, and the exit chamber 10 is evacuated by the vacuum pump to a desired level of vacuum, for example $10^{-2}$ to $10^{-5}$ Torr.

The optical element in the carrier 20 taken out from the exit chamber 10 shows a larger shrinkage than the carrier because of a larger thermal expansion coefficient, and can therefore be easily taken out from the carrier at room temperature.

The present invention is not limited to the foregoing embodiments but various members thereof can be modified manners.

As an example, instead of one-by-one transportation of the carriers 20 in the foregoing embodiments, it is also possible to place several carriers 20 on a pallette and to place such pallettes on the guide rail 18 for movement in the direction A. Naturally in such case the press zone 6-2 is provided with a number of sets of the upper and lower molds and the evaporation chamber is provided with a number of containers 42, corresponding to the number of carriers on a pallette. In this manner it is possible to increase the manufacturing speed of the optical elements.

Also, instead of one-by-one introduction or extraction of the carriers into the entrance chamber 4 or from the exit chamber 10, it is possible to introduce or extract several carriers at a time. In such case the entrance chamber 4 and the exit chamber 10 are naturally so constructed as to accommodate several carriers 20. This method allows reduction of the number of air introductions and evacuations of the entrance chamber and exit chamber.

It is furthermore possible to employ large entrance chamber and exit chamber with shelves for storing a plurality of carriers, to store a large number of carriers 20 in advance in the shelves of the entrance chamber 4, to forward the carriers in succession from said shelves to the forming chamber 6 along the guide rail 18, and to store the carriers forwarded in succession from the evaporation chamber 8 in the shelves of the exit chamber 10. In this case the entrance chamber and the exit chamber function also as stockers.

The exit chamber functioning as a stocker may be provided with heaters for annealing, thereby obtaining optical elements with further reduced strain.

The evaporation chamber 8 may be further provided with a member for preventing the dropping of the optical elements when the carriers are inverted, thereby improving the safety of operation.

As explained in the foregoing, the apparatus of the present invention allows an integrated production of optical elements from the material therefor to the thin layer deposition onto the functional faces, with a sufficiently high surface precision of said functional faces.

Also, the apparatus of the present invention allows elimination of ancillary works between the process steps and a washing step before the vacuum evaporation, thereby improving the efficiency and reducing the cost of optical element production.

Furthermore, the apparatus of the present invention, capable of forming the functional faces and depositing the thin layers thereon in continuous manner, allows elimination of the products in process thereby drastically facilitating production control.

In addition, the apparatus of the present invention use of a single carrier for the steps of heating, pressing, cooling, evaporation and transportation of glass material and to cause the carrier to perform a function of the mold by providing said carrier with seat faces 20a, 20b for engaging with the upper and lower molds, thereby eliminating the necessity of charging the carrier during the production process and thus improving the operation efficiency.

Further, the inventing means provided in the carrier activated in the evaporation step allows particular inventing means in the apparatus to be dispensed with, thereby reducing the cost of the apparatus and improving the production efficiency.

What is claimed is:

1. A producing apparatus provided at least with a heating unit and a pressing unit and adapted for producing optical elements from a glass material by the function of said units, comprising:
    a carrier for transporting said glass material to said units; and
    means for inverting the optical element formed by pressing in said pressing unit, wherein said inverting means comprising an arm for holding said carrier supporting said optical element, and means for inverting said arm.

2. An apparatus for heating a material for optical element and pressing the heated material, comprising:
    a molding chamber for effecting the heating and the pressing of said optical element material under a non-oxidization atmosphere, said molding chamber having heating means for heating said optical element material, pressing means for pressing the heated optical element material, a carrier for holding said optical element material and guide means for guiding said carrier;
    an entrance chamber for introducing the optical element material held by said carrier into said molding chamber;
    means for moving said carrier holding the optical element material introduced into said molding chamber;
    depositing means having a depositing chamber shut by said molding chamber and shutter means and provided with a guide connected to said guide means, the molded optical element held by the carrier being transferred by said moving means on said connected guides in said molding chamber and the depositing chamber into said depositing chamber in accordance with an openclose operation of said shutter means, a surface of said optical element pressed by said pressing means being treated by vapor deposition treatment; and
    an exit chamber connected to said depositing means for taking out the deposited optical element from the depositing means.

3. An apparatus for heating a material for an optical element and pressing the heated optical element material, comprising:
    a molding chamber for effecting the heating and the pressing of said optical element material, said molding chamber having heating means for heating said optical element material and pressing means for pressing the heated optical element material;
    means for carrying said optical element material, said means having carrier for holding said optical element material and guide means for guiding said carrier to said pressing means; and
    floating means for floating siad carrier up from said guide means while said optical element material is pressed by said pressing means after said carrier holding said optical element material is conveyed to the press position.

4. An apparatus according to claim 2, further comprising means for inverting the optical element formed by pressing in said pressing unit, wherein said inverting means comprises an arm for holding said carrier supporting said optical element, and means for inverting said arm.

5. An apparatus according to claim 3, wherein a pressing tool member constituting said pressing means is through said guide and an opening portion is provided in said guide for pressing the optical element material held by said carrier, and wherein a stopper is provided for regulating a position of floating of said carrier.

* * * * *

UNITED STATES PATENT AND TRADEMARK OFFICE
CERTIFICATE OF CORRECTION

PATENT NO. : 4,756,737
DATED : July 12, 1988
INVENTOR(S) : FUMITAKA YOSHIMURA, ET AL.

It is certified that error appears in the above-identified patent and that said Letters Patent is hereby corrected as shown below:

Column 2, line 32, "chamber" should read --chambers--;

line 33, "chamber" should read --chambers--.

Column 4, line 45, "to" should read --so--;

line 52, "in completely" should read --incompletely--;

line 56, "each" should read --with each--.

Column 5, line 22, "eberrated" should read --aberrated--;

line 64, "exit chamber 8" should read --exit chamber 10--.

Column 6, line 17, "manners" should be deleted.

UNITED STATES PATENT AND TRADEMARK OFFICE
CERTIFICATE OF CORRECTION

PATENT NO.   :   4,756,737
DATED        :   July 12, 1988
INVENTOR(S)  :   FUMITAKA YOSHIMURA, ET AL.

It is certified that error appears in the above-identified patent and that said Letters Patent is hereby corrected as shown below:

Column 7, line 3, "use" should read --uses--;

line 12, "inventing" should read --inverting--;

lines 13-14, "inventing" should read --inverting--;

line 26, "comprising" should read --comprises--;

line 29, "optical" should read --an optical--.

Signed and Sealed this

Fifteenth Day of November, 1988

Attest:

DONALD J. QUIGG

*Attesting Officer*       *Commissioner of Patents and Trademarks*